United States Patent
Yang

(10) Patent No.: US 6,698,716 B2
(45) Date of Patent: Mar. 2, 2004

(54) SUCTION VALVE FOR WATER BAG

(76) Inventor: Shih-Sheng Yang, P.O. Box 82-144, Taipei (TW)

( * ) Notice: Subject to any disclaimer, the term of this patent is extended or adjusted under 35 U.S.C. 154(b) by 113 days.

(21) Appl. No.: 10/161,725

(22) Filed: Jun. 5, 2002

(65) Prior Publication Data

US 2003/0183797 A1 Oct. 2, 2003

(30) Foreign Application Priority Data

Mar. 27, 2002 (TW) ...................................... 91203768 U

(51) Int. Cl.[7] .............................................. F16K 25/00
(52) U.S. Cl. ........................ 251/288; 222/175; 220/714
(58) Field of Search ................................ 251/286, 288, 251/345, 352; 222/175; 224/148.2; 220/714

(56) References Cited

U.S. PATENT DOCUMENTS 2,165,639 A * 7/1939 Marx ..................... 137/625.31
5,791,510 A * 8/1998 Paczonay .................... 220/714
5,881,999 A * 3/1999 Chen .......................... 251/352
6,557,721 B2 * 5/2003 Yang .......................... 220/713

* cited by examiner

Primary Examiner—Edward K. Look
Assistant Examiner—John K Fristoe, Jr.
(74) Attorney, Agent, or Firm—Leong C. Lei

(57) ABSTRACT

A suction valve for water bag, includes a mounting block fastened to the water outlet tube of a collapsible water bag and adapted for guiding water out of the water outlet tube, a rotary valve block coupled to the mounting block for free rotation between a first position where the valve block closes the water passage through the mounting block and a second position where the valve block opens the water passage through the mounting block, a flexible suction nozzle threaded onto a tubular front screw rod of the rotary valve block for enabling the user to suck when the valve block rotated to the second position, and a hygienic cap adapted for protecting the flexible suction nozzle.

4 Claims, 5 Drawing Sheets

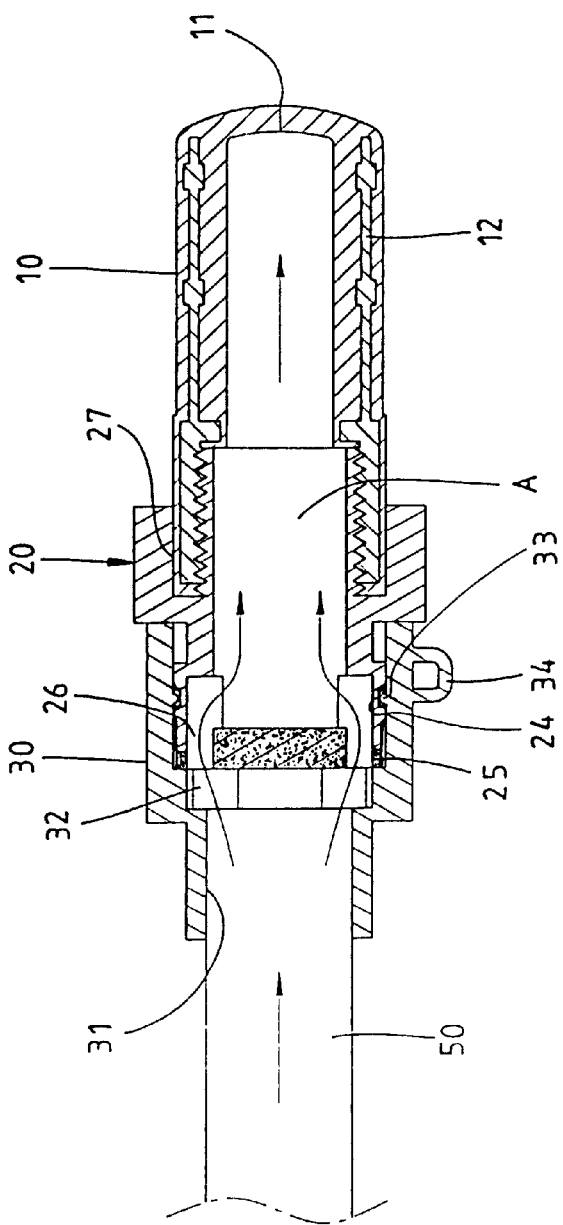
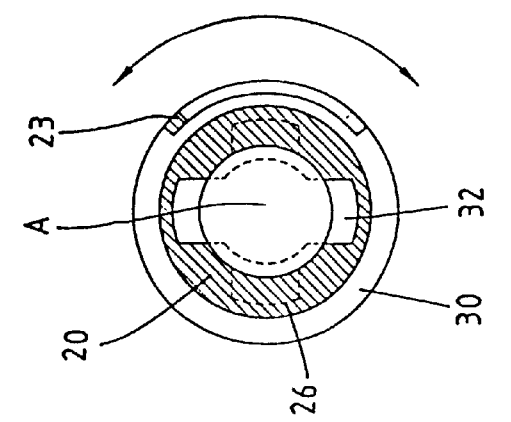
FIG. 5
FIG. 6

SUCTION VALVE FOR WATER BAG

BACKGROUND OF THE INVENTION

1. Field of the Invention

The present invention relates to collapsible water bags and, more specifically, to a suction valve for water bag.

2. Description of the Related Art

A variety of collapsible water bags for bicycle rider and outdoor games have been disclosed, and have appeared on the market. Regular collapsible water bags are commonly equipped with a suction valve (nozzle) through which the user sucks in water. Regular suction valves for water bag include two types, namely, the hard type and the soft (flexible) type. FIGS. 1A and 1B show a soft (flexible) suction valve according to the prior art. This structure of soft (flexible) suction valve 1 is molded from polyurethane rubber or silicon rubber, having a crossed split 3 in the tip 2. Normally, the spring power of the material property of the soft (flexible) suction valve 1 forces the tip 2 to close the crossed split 3 (see FIG. 1A). When the user sucks the tip 2, the tip 2 is deformed to open the crossed split 3 (see FIG. 1B). This structure of suction valve 1 is functional, however the tip 2 tends to be deformed accidentally, causing a water leakage. When the water bag put in one's backpack, other storage items in the backpack may squeeze the tip 2, thereby causing the tip 2 to open the crossed split 3.

FIG. 2 shows a hard type suction valve according to the prior art. According to this design, the hard type suction valve 4 comprises a stopper 5 provided in an axially extended stepped water passage thereof, a spring member 6, which supports the stopper 5 in the closed position, and a lever 7 adapted for receiving pressure from the user's teeth to compress the spring member 6 and simultaneously to open the stopper 5. When sucking in water from the suction valve 4, the user must squeeze the teeth against the lever 7 with effort.

U.S. Pat. No. 6,085,947 discloses another design of soft suction valve. This design achieves water passage opening/closing control through a linear action.

SUMMARY OF THE INVENTION

It is one object of the present invention to provide a suction valve for water bag, which closes/opens the water passage through a rotary motion. It is another object of the present invention to provide a suction valve for water bag, which enables the user to regulate the flow rate of output water. It is still another object of the present invention to provide a suction valve for water bag, which is comfortable in use. According to one aspect of the present invention, the suction valve for water bag comprises a mounting block fastened to the water outlet tube of a collapsible water bag and adapted for guiding water out of the water outlet tube, a rotary valve block coupled to the mounting block for free rotation between to close/open the water passage and to regulate the flow rate, and a flexible suction nozzle threaded onto a tubular front screw rod of the rotary valve block for enabling the user to suck when the valve block rotated to the second position. According to another aspect of the present invention, the flexible suction nozzle has a flexible plastic body internally reinforced with rigid plastic stretcher members. According to still another aspect of the present invention, the suction valve further comprises a hygienic cap connected to the mounting block by a cord member and adapted for protecting the flexible suction nozzle.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

BRIEF DESCRIPTION OF THE DRAWINGS

FIG. 5 is a sectional view of the present invention showing the suction valve opened FIG. 6 is a cross sectional view of the present invention showing the suction valve closed.

DETAILED DESCRIPTION OF THE PREFERRED EMBODIMENT

Figure 1A:
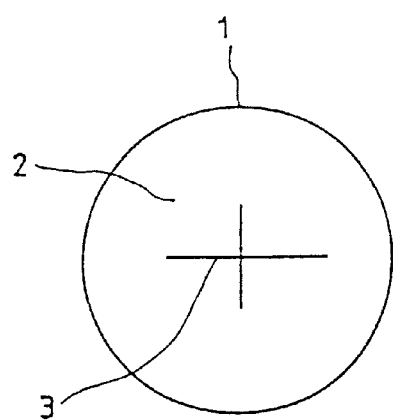
FIG. 1A is a schematic drawing showing the closed status of a soft suction valve for water bag according to the prior art.
Figure 1B:
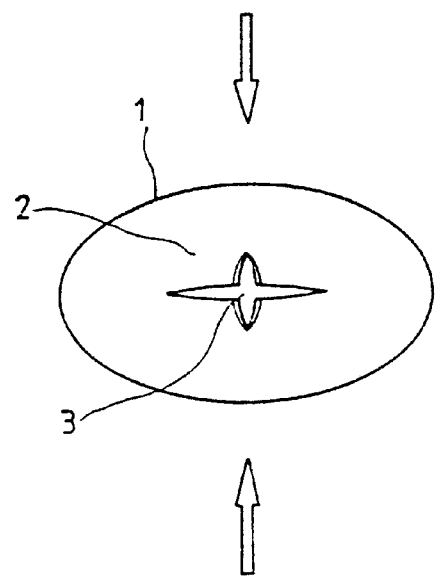
FIG. 1B is corresponding to FIG. 1A but showing the soft suction valve opened.
Figure 2:
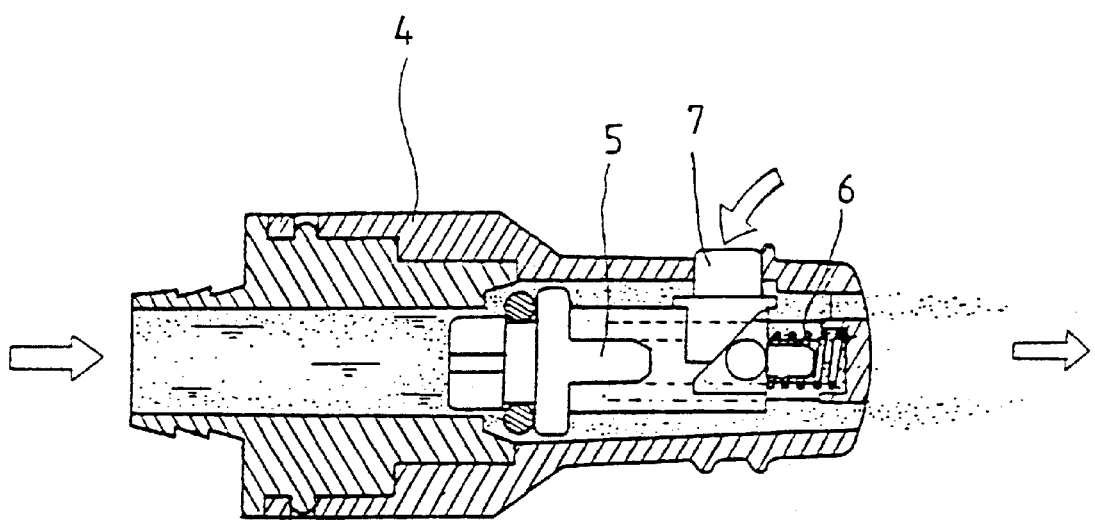
FIG. 2 is a schematic drawing showing a hard suction valve for water bag according to the prior art.

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Referring to FIGS. from 3 through 5, a suction valve for water bag in accordance with the present invention is shown comprised of flexible suction nozzle 10, a rotary valve block 20, a mounting block 30, and a hygienic cap 40. The mounting block 30 is adapted for securing the suction valve to the water outlet tube 50 of a collapsible water bag (not shown).

The flexible suction nozzle 10 is molded from flexible plastics for comfortable suction with the mouth and internally reinforced with rigid plastic stretcher members 12, having a crossed split 11 in the transversely suspended thin layer of front sidewall thereof and a screw hole 13 axially disposed in the rear side thereof. The rotary valve block 20 comprises a front tubular screw rod 21 threaded into the screw hole 13 of the flexible suction nozzle 10, a finger wheel 22 fixedly disposed on the middle for the gripping of the fingers, a protrusion 23 protruded from one side of the finger wheel 22, a water passage A defined on the inside and adapted for guiding water from the mounting block 30 to the flexible suction nozzle 10, a coupling groove 24 extended around the periphery and spaced from the finger wheel 22 at one side opposite to the front tubular screw rod 21, a gasket 25 fixedly transversely provided in the rear side thereof, a water gate 26 provided in the gasket 25 in communication with the water passage A, and a sealing flange 27 protruded from the inner diameter of the finger wheel 22 and spaced around the front screw rod 21 and adapted for sealing the screw hole 13 of the flexible suction nozzle 10 when threading the front screw rod 21 into the screw hole 13. The mounting block 30 comprises a stepped center through hole 31 fastened to the front end of the water outlet tube 50 and the rear part of the valve block 20, a water gate 32 disposed in the stepped center through hole 31, an inside annular coupling flange 33 coupled to the coupling groove 24 of the valve block 20 for enabling the valve block 20 to be rotated with the fingers relative to the mounting block 30, a guide groove 36 disposed in the front side, which receives the protrusion 23 of the valve block 20 to guide rotary motion of the valve block 20 between two limits, and a hanging lug 34 protruded from the periphery at one side. The hygienic cap 40 is adapted to cover the flexible suction nozzle 10 when not in use, having a hanging lug 41 protruded from the periphery and connected to the hanging lug 34 of the mounting block 30 by a cord member 35.

Referring to FIG. 6 and FIG. 5 again, when rotating the finger wheel 22 of the valve block 20 in one direction relative to the mounting block 30 to move the protrusion 23 to one end of the guide groove 36, the water gate 26 of the valve block 20 is aligned with the water gate 32 in the mounting block 30, enabling water to pass from the water outlet tube 50 through the water passage A to the inside of the flexible suction nozzle 10, and therefore the user can suck in water from the flexible suction nozzle 10 through the crossed split 11. On the contrary, when rotating the finger wheel 22 of the valve block 20 in the reversed direction relative to the mounting block 30 to move the protrusion 23 to the other end of the guide groove 36, the water gate 26 of the valve block 20 is biased from the water gate 32 in the mounting block 30, and the gasket 25 stops the passage through the water gates 32; 36, and therefore the water passage A and the flexible suction nozzle 10 are closed.

Figure 3:
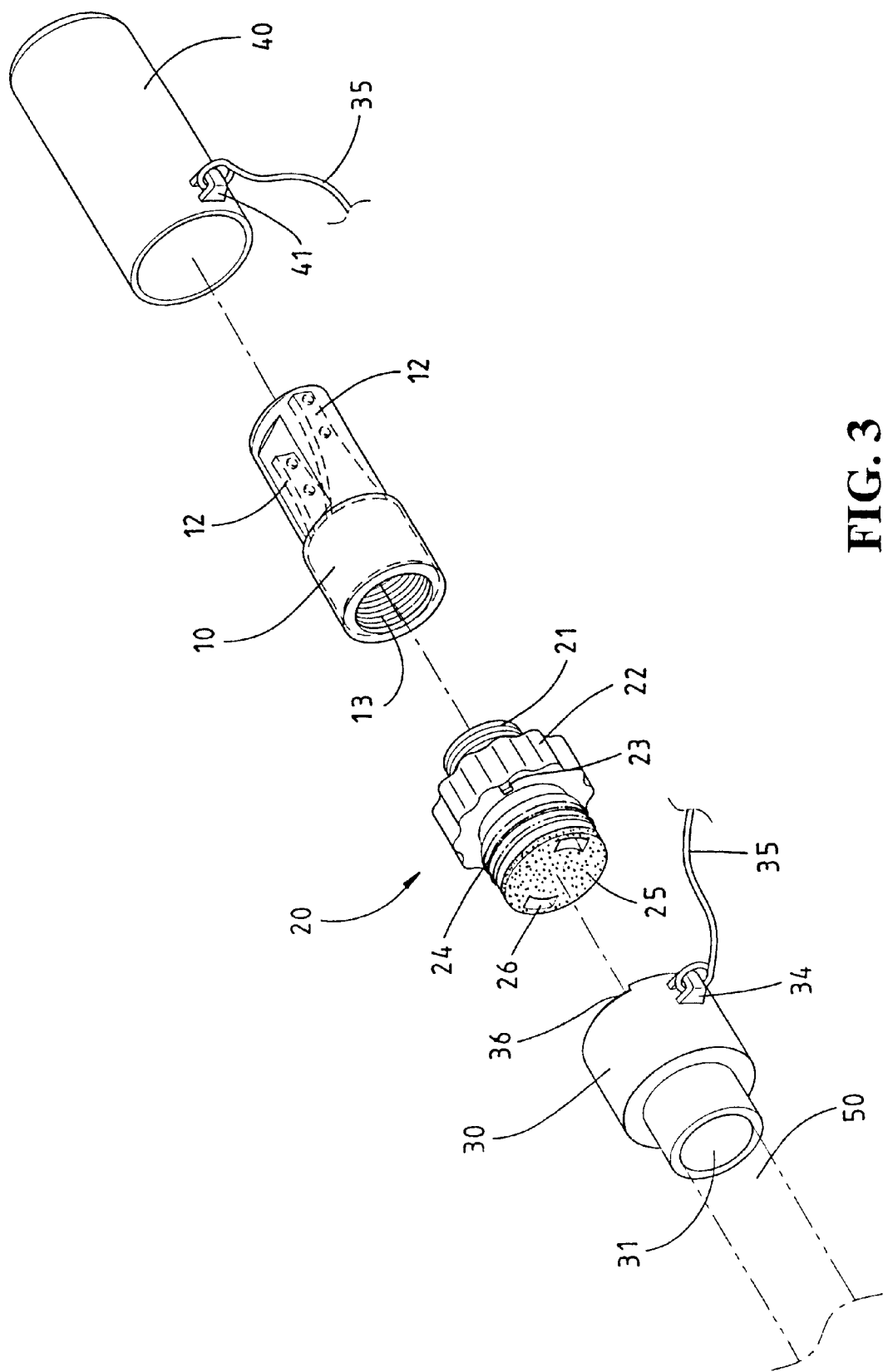
FIG. 3 is an exploded view of a suction valve for water bag according to the present invention.
Figure 4:
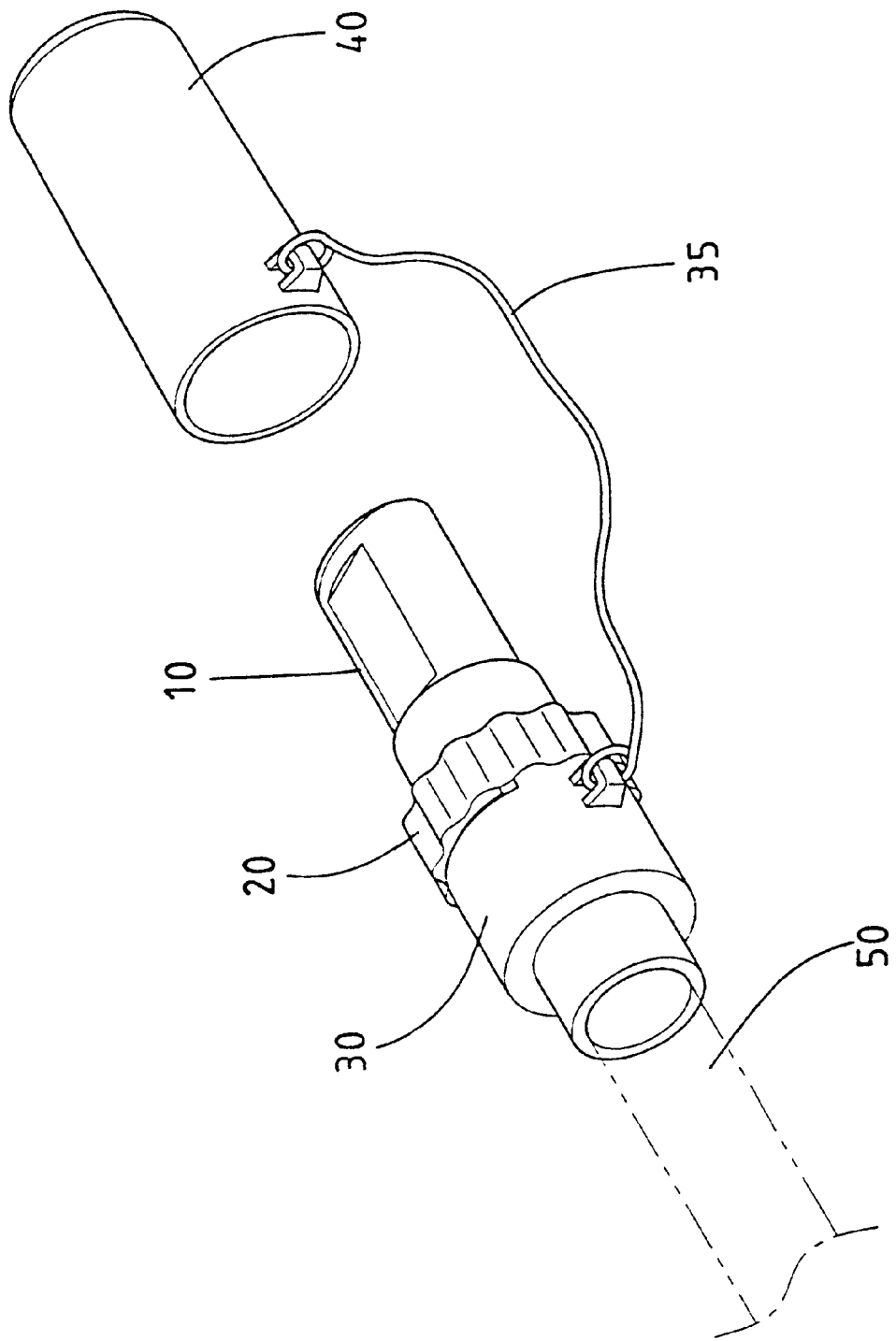
FIG. 4 is an elevational assembly view of the suction valve for water bag according to the present invention.

A prototype of suction valve for water bag has been constructed with the features of FIGS. 3~6. The suction valve for water bag functions smoothly to provide all of the features discussed earlier.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A suction valve for water bag comprising: a mounting block fastened to the water outlet tube of a collapsible water bag, said mounting block comprising a stepped center through hole fastened to a front end of said water outlet tube, a water gate disposed in said stepped center through hole and adapted for guiding water out of said water outlet tube, an inside annular coupling flange, a guide groove disposed in a front side; a rotary valve block coupled to said mounting block for rotating by the user to close/open the water gate of said mounting block, said rotary valve block comprising a front tubular screw rod, a finger wheel fixedly disposed on the middle for the gripping of the fingers, a protrusion protruded from one side of said finger wheel and inserted into said guide groove of said mounting block to guide rotary motion of said rotary valve block relative to said mounting block between a first position to close the water gate of said mounting block and a second position to open the water gate of said mounting block a water passage defined on the inside and adapted for receiving water from the water gate of said mounting block, a coupling groove extended around the periphery thereof and coupled to the coupling flange of said mounting block, a gasket fixedly transversely provided in a rear side thereof and adapted for closing the water gate of said mounting block, a water gate provided in said gasket and adapted for guiding water from the water gate of said mounting block to said water passage when said rotary valve block rotated to said second position, and a sealing flange protruded from an inner diameter of said finger wheel and spaced around said front screw rod; and a flexible suction nozzle fastened to said rotary valve block and stopped against said sealing flange, said flexible suction nozzle having a crossed split in a transversely suspended thin layer of front sidewall thereof and a screw hole axially disposed in a rear side thereof and threaded onto the front tubular screw rod of said rotary valve block.

2. The suction valve as claimed in claim 1, wherein said flexible suction nozzle has a flexible plastic body internally reinforced with rigid plastic stretcher members.

3. The suction valve as claimed in claim 1 further comprising a hygienic cap adapted for covering said flexible suction nozzle.

4. The suction valve as claimed in claim 1, wherein said mounting block comprises a hanging lug protruded from the periphery thereof; said hygienic cap comprises a hanging lug protruded from the periphery thereof and connected to the hanging lug of said mounting block by a cord member.

* * * * *